United States Patent [19]
Cowan et al.

[11] Patent Number: 5,147,852
[45] Date of Patent: * Sep. 15, 1992

[54] REDUCTION OF SEEPAGE LOSSES IN WELL WORKING COMPOSITIONS

[75] Inventors: Jack C. Cowan, Lafayette, La.; Roy F. House, Houston, Tex.; Andreé H. Harrington, Lafayette, La.

[73] Assignee: Venture Innovations, Inc., Lafayette, La.

[ * ] Notice: The portion of the term of this patent subsequent to Apr. 2, 2008 has been disclaimed.

[21] Appl. No.: 767,866

[22] Filed: Sep. 30, 1991

Related U.S. Application Data

[63] Continuation-in-part of Ser. No. 659,178, Feb. 22, 1991, Pat. No. 5,076,944, which is a continuation-in-part of Ser. No. 421,751, Oct. 16, 1989, Pat. No. 5,004,553, and Ser. No. 624,631, Dec. 10, 1990, Pat. No. 5,071,575, which is a continuation-in-part of Ser. No. 421,751, Oct. 16, 1989, Pat. No. 5,004,553.

[51] Int. Cl.$^5$ .............................................. C09K 7/00
[52] U.S. Cl. ................... 507/104; 252/8.551; 175/72
[58] Field of Search ............ 507/104; 252/8.551; 175/72

[56] References Cited

U.S. PATENT DOCUMENTS

| | | | |
|---|---|---|---|
| 2,319,705 | 5/1943 | Post et al. | 507/104 |
| 2,599,745 | 6/1952 | Campbell et al. | 507/104 |
| 2,691,629 | 10/1954 | Stoner | 507/104 |
| 2,793,995 | 5/1957 | Twining | 507/104 |
| 2,811,488 | 10/1957 | Nestle et al. | 507/104 |
| 2,943,680 | 7/1960 | Scott et al. | 507/104 |
| 3,208,524 | 9/1965 | Horner et al. | 175/72 |
| 3,441,528 | 4/1969 | Dede, Jr. et al. | 507/104 |
| 3,629,102 | 12/1971 | Lummus et al. | 507/104 |
| 3,724,564 | 4/1973 | Messenger | 175/72 |
| 3,788,405 | 1/1974 | Taylor | 175/72 |

OTHER PUBLICATIONS

"Composition and Properties of Oil Well Drilling Fluids", Rogers, Gulf Publishing 3rd Ed. pp. 663–670.
"Drilling and Drilling Fluids", Chilingarian et al., Elsevier, N.Y., 1983 pp. 547–549.

*Primary Examiner*—Robert L. Stoll
*Assistant Examiner*—C. Sayala
*Attorney, Agent, or Firm*—Roy F. House

[57] ABSTRACT

The invention provides well working compositions containing a particulate additive to decrease the seepage loss of the fluid to fluid permeable formations contacted by the compositions. The additive comprises: (1) a cellulosic material selected from the group consisting of oat hulls, citrus pulp, beet pulp, paper, bagasse, peat, corn cobs, kenaf, rice hulls, rice bran, straw, cottonseed hulls, soybean hulls, and mixtures thereof (2) a particulate mixture of a first cellulosic material selected from the group consisting of oat hulls, cotton burrs, and mixtures thereof, and a second cellulosic material selected from the group consisting of beet pulp, paper, bagasse, wood, peat, kenaf, rice hulls, rice bran, cottonseed hulls, soybean hulls, straw, peanut shells, nut shells, cotton, and mixtures thereof; or (3) a particulate mixture of an oleaginous liquid and a cellulosic material selected from the group consisting of oat hulls, cotton burrs, citrus pulp, beet pulp, paper, bagasse, wood, corn cobs, kenaf, peat, rice hulls, rice bran, cottonseed hulls, soybean hulls, nut shells, straw, and mixtures thereof; provided that the cellulosic materials have a certain particle size distribution as set forth in the specification.

16 Claims, No Drawings

REDUCTION OF SEEPAGE LOSSES IN WELL WORKING COMPOSITIONS

This application is a continuation-in-part of copending patent application Ser. No. 07/659,178 filed Feb. 22, 1991, now U.S. Pat. No. 5,076,944, which is a continuation-in-part of the copending patent application Ser. No. 07/421,751 filed Oct. 16, 1989, now U.S. Pat. No. 5,004,553, and a continuation-in-part of copending patent application Ser. No. 07/624,631 filed Dec. 10, 1990, now U.S. Pat. No. 5,071,575 which is also a continuation-in-part of then copending patent application Ser. No. 07/421,751 filed Oct. 16, 1989, now U.S. Pat. No. 5,004,553.

The invention relates to compositions for use in well-working operations such as drilling, workover and completion, packing and the like, well-working processes utilizing such compositions, and an additive to reduce the seepage loss of the compositions to the formation.

In the rotary drilling of wells for oil and gas, drilling fluids ("muds") are circulated in such a manner as to remove cuttings and to support the walls of the hole. The fluids may be either water base, comprising for example, clay, polymers, weight material and other additives dispersed in water, or oil base, comprising for example, suspending agents (generally organophilic clays), emulsifiers, stability agents, filtration control agents, weighting agents, and other additives dispersed in diesel oil and the like oleaginous mediums, all as are well known in the art.

A thin, low-permeability filter cake on the sides of the borehole is necessary to control the filtration characteristics of the drilling fluid since the pressure of the mud column in the borehole is greater than the formation pressure. A filter cake forms when the drilling fluid contains particles of a size only slightly smaller than the size of the pore openings of the formation. The liquid which enters the formation while the cake is being established, is known as the surge loss or spurt loss, while the liquid which enters after the cake is formed as the drilling fluid filtrate. The permeability of the filter cake is directly related to the particle size distribution in the drilling fluid, and, in general, the cake permeability decreases as the concentration of particles in the colloidal size range increases.

The filtration properties required for the successful completion of a well depend on the nature of the formations being drilled and on the type of drilling fluid used. Thus in water sensitive formations, oil base mud provides superior hole stabilization when the salinity of the aqueous phase of the mud is adjusted to prevent migration of water from the mud to the formation.

Both the spurt loss and filtration rate must be minimized when penetrating potentially productive formations in order to minimize any damaging effects from fluids entering the formation. These properties should also be minimized throughout the drilling process when using oil base muds because of the high cost of these muds.

When the drilling bit passes through the porous, fractured or vugular strata such as sand, gravel, shale, limestone and the like, the hydrostatic pressure caused by the vertical column of drilling fluid exceeds the ability of the surrounding earth formation to support this pressure. As a consequence drilling fluid is lost to the formation and fails to return to the surface. This loss may be any fraction up to 100% loss of the total circulating drilling fluid volume. This condition is known in the art as lost circulation. Even with the best drilling practices, circulation losses can and will occur. Loss zones can be classified as seepage loss (when the severity of the loss is 1 to 10 bbl/hr [0.16 to 1.6 m$^3$/h]), partial loss (when the severity of the loss is 10 to 500 bbl/hr [1.6 to 80 m$^3$/h]), and complete loss (when the severity of the loss is greater than 500 bbl/hr [80 m$^3$/h]).

In order to combat or prevent lost circulation, it has been common in the past to add any number of materials to the drilling fluid which act to reduce or prevent flow of the drilling fluid outwardly in a porous stratum thereby arresting a lost circulation condition. These materials are commonly referred to as lost circulation materials. Such prior known lost circulation materials include fibrous, flake, and granular materials. Representative of the organic natural products or modifications thereof that have been disclosed for use as lost circulation materials include nut and seed shells or hulls (pecan, almond, walnut, peach, brazil, coconut, peanut, sunflower, flax, cocoa bean, cottonseed, rice, linseed); crude pectate pulp; feathers; citrus pulp; beet pulp; peat moss fibers; jute; flax; mohair; lechuguilla fibers; cotton; cotton linters; wool; paper; wet-strength paper; sugar cane; bagasse; bamboo; corn stalks; sawdust; straw; wood fiber; cedar fiber; bark chips; cork; popped popcorn; dehydrated vegetable matter (suitably dehydrated carbohydrates such as citrus pulp, oatmeal, tapioca, rice grains, potatoes, carrots, beets, and various grain sorghums); the ground woody ring portion of corn cobs; whole ground corn cobs; hydrophobic, organophilic, water-wettable fibrous materials such as treated cotton, dried bagasse, and dried peat fibers; and specific mixtures of these materials. Many assorted inorganic materials have been used as lost circulation additives.

Seepage losses can occur to any type of loss zone and in any type of formation when the particles in the mud are not fine enough to complete the seal. It has been established that the maximum allowable drilling fluid loss is on the order of 1 bbl/hr [0.16 m$^3$/h], as measured in the mud pit at the surface. Remedial measures should be taken when the mud loss exceeds 1 bbl/hr [0.16 m$^3$/h].

In the rotary drilling of wells with aqueous base drilling fluids, various problems associated with the lubricating characteristics of the drilling fluid may occur, such as slow drilling rate, excessive drill pipe torque and drag, differential sticking, etc. See for example U.S. Pat. No. 4,356,096, incorporated herein by reference. This patent discloses that liquid lubricating additives can be sorbed onto certain hydrophobic, organophilic, water wettable absorbents to filter out or deposit in the wall cake on the sides of the borehole. This results in an increased concentration of the liquid lubricant in the wall cake where it is needed. The liquid lubricant can be premixed with the sorbent before adding the resulting solid lubricating additive to the drilling fluid.

It is object of the present invention to provide an additive which is very effective as a seepage loss control agent in both water base and oil base well working fluids.

It is another object of this invention to provide well working compositions having a low seepage loss.

Still another object of this invention is to provide a method of decreasing the seepage loss from water base and oil base well working fluids.

A further object is to provide an additive which is effective as both a seepage loss reducing additive and a lubricating additive in water base drilling fluids.

These and other objects of the invention will appear to one skilled in the art as the description thereof proceeds.

In accordance with one illustrative embodiment of the invention we have found that cellulosic materials selected from the group consisting of citrus pulp, beet pulp, paper, bagasse, peat, corn cobs, kenaf, rice hulls, rice bran, straw, cottonseed hulls, soybean hulls, and mixtures thereof are effective in both water base and oil base well working fluids to decrease the seepage loss thereof, provided that the cellulosic material has a particle size distribution such that less than about 20% of the particles are greater than 590 microns, from 0% to 100% of the particles are from 250 microns to 590 microns, from 0% to 100% of the particles are from 149 microns to 250 microns, from 0% to 100% of the particles are from 74 microns to 149 microns, and from 0% to 70% of the particles are less than 74 microns, the particle size being determined by dry sieve analysis after admixing the cellulosic material with 3% of fumed silica.

In accordance with another embodiment of the invention, we have found that particulate mixtures of a first cellulosic material selected from the group consisting of oat hulls, cotton burrs, and mixtures thereof, and a second cellulosic material selected from the group consisting of beet pulp, paper, bagasse, wood, peat, kenaf, rice hulls, rice bran, cottonseed hulls, soybean hulls, straw, peanut shells, nut shells, cotton, and mixtures thereof, are also excellent additives to decrease the seepage loss of certain water base and oil base well working fluids, provided that the particulate mixture has a particle size distribution such that less than about 20% of the particles are greater than 590 microns, from 0% to 100% of the particles are from 250 microns to 590 microns, from 0% to 100% of the particles are from 149 microns to 250 microns, from 0% to 100% of the particles are from 74 microns to 149 microns, and from 0% to 70% of the particles are less than 74 microns, the particle size being determined by dry sieve analysis after admixing the cellulosic material with 3% of fumed silica.

In accordance with another embodiment of the invention, we have found that a particulate mixture containing an oleaginous liquid and a cellulosic material selected from the group consisting of oat hulls, cotton burrs, citrus pulp, beet pulp, paper, bagasse, wood, corn cobs, kenaf, peat, rice hulls, rice bran, cottonseed hulls, soybean hulls, nut shells, straw, and mixtures thereof is effective as a seepage loss reducing additive and a lubricating additive in water base well working fluids provided that the cellulosic material has a particle size distribution such that less than about 20% of the particles are greater than 590 microns, from 0% to 100% of the particles are from 250 microns to 590 microns, from 0% to 100% of the particles are from 149 microns to 250 microns, from 0% to 100% of the particles are from 74 microns to 149 microns, and from 0% to 70% of the particles are less than 74 microns, the particle size being determined by dry sieve analysis after admixing the cellulosic material with 3% of fumed silica.

The cellulosic materials or mixtures thereof useful in this invention must have a particle size distribution such that less than about 20% of the particles are greater than 590 microns, from 0% to 100% of the particles are from 250 microns to 590 microns, from 0% to 100% of the particles are from 149 microns to 250 microns, from 0% to 100% of the particles are from 74 microns to 149 microns, and from 0% to 70% of the particles are less than 74 microns, the particle size being determined by dry sieve analysis after admixing the cellulosic material with 3% of fumed silica. Preferably the particle size distribution (hereinafter sometimes referred to as "PSD") will be either PSD #1 or PSD #2 wherein PSD #1 is as follows: >590 microns<20%, <590 microns>250 microns=0-100%, <250 microns>149 microns=0-100%, <149 microns>74 microns=0-60%, <74 microns=0-60%, and <590 microns>149 microns≧15%; and PSD #2 is as follows: >590 microns<10%, <590 microns>250 microns=0-30%, <250 microns>149 microns=0-30%, <149 microns>74 microns>15%, and <74 microns=0-70%.

We have found that the cellulosic materials or mixtures thereof having PSD #1 are particularly effective in combating seepage losses in weighted drilling fluids whereas the cellulosic materials or mixtures thereof having a PSD #2 are particularly effective in combating seepage losses in low solids well working fluids. Experimental investigation of any well working fluid with the cellulosic materials of PSD #1, PSD #2, and mixtures thereof will indicate the optimum material to use for the most efficient seepage loss reduction.

The cellulosic material is generally processed to provide the particle size distribution necessary as set forth herein. Thus the cellulosic material or mixture of cellulosic materials may be prepared by grinding and sieving (if necessary). The cellulosic material may be treated to enhance the breakdown of the particles. This can be accomplished by mixing the cellulosic material with an alkali metal, preferably sodium and/or potassium, hydroxide or basic salt thereof, such as carbonate, sulfite, acetate, and the like, and water or stream, and heating the thus moistened particles. Preferably the moistened particles are extruded through a die to produce pellets. The heat generated in the extrusion process will generally suffice to dry the material. The treated cellulosic material, whether pelleted or not, can be finely ground by passing the same through an attrition mill which is capable of grinding the cellulosic material. We have found that a Micro Pulverizer is quite suitable provided that the feed rate to the mill is controlled to give the desired particle size. Alternatively, the cellulosic material can be treated with anhydrous hydrochloric acid gas as in the process disclosed in Cowan et al. U.S. Pat. No. 4,404,107, incorporated herein by reference. The particles treated with anhydrous hydrochloric acid gas are preferably passed to an attrition mill bypassing any pelletization equipment. The cellulosic material can also be treated with sulfuric acid to break down the larger particles. Preferably the sulfuric acid, at a concentration of at least 60%, most preferably at least 70% by weight, is mixed with a surfactant and foamed prior to contacting the cellulosic material. In this manner less sulfuric acid is needed to degrade the cellulosic material.

The seepage loss reducing additive of this invention which comprises a particulate mixture of a first cellulosic material selected from the group consisting of oat hulls, cotton burrs, and mixtures thereof, and a second cellulosic material selected from the group consisting of beet pulp, paper, bagasse, wood, peat, kenaf, rice hulls, rice bran, cottonseed hulls, soybean hulls, straw, peanut shells, nut shells, cotton, and mixtures thereof, having the particle size set forth herein may contain from about 1% to about 99% of the first cellulosic material and from about 1% to about 99% of the second cellulosic material.

Other finely ground material can be admixed with the cellulosic materials of this invention to produce seepage loss reducing additives having the particle size distribution set forth herein. The seepage loss reducing additives of this invention can be mixed with materials having a larger particle size distribution and the mixture used to combat larger losses of the fluid to the formations being drilled. Alternatively, the seepage loss reducing additive can be separately added to a drilling fluid to which a material having a larger particle size distribution is also added.

Different methods have been developed for particle size measurement. The most widely employed sizing method determines particle size by the degree to which a powder is retained on a series of sieves with different opening dimensions. This technique is straightforward and requires simple equipment, but without attention to detail it can lead to erroneous results. The sieves, particularly those with the finer meshes, are damaged by careless handling. They tend to become clogged with irregularly shaped particles unless agitated, but distorted if agitated too much. Furthermore, it is always a concern to determine when all particles that might pass through a sieve have done so.

A typical sieve is a shallow pan with a wire mesh bottom or an electroformed grid. Opening dimensions in any mesh or grid are generally uniform within a few percent. Sieves are available with openings from 5 microns in several series of size progression. Woven wire-mesh sieves have approximately square openings whereas electroformed sieves have round, square, or rectangular openings. Wire sieves tend to be sturdier and less expensive, and have a greater proportion of open area. They are much more frequently employed than are electroformed sieves except in the very fine particle range where only electroformed sieves are available.

Dry-sieving is typically performed with a stack of sieves with openings diminishing in size from the top downward. The lowest pan has a solid bottom to retain the final undersize. Powders are segregated according to size by placing the powder on the uppermost sieve and then shaking the stack manually, with a mechanical vibrator, or with air pulses of sonic frequency until all particles fall onto sieves through which they are unable to pass or into the bottom pan. In another device, sieves are employed one at a time within a container from which passing particles are captured by a filter. Agitation on the sieve is provided by a rotating air jet. The material retained by the sieve is recovered and recycled with the next coarser sieve until all of the powder is exposed to the desired series of sieves or all material passes.

Wet-sieving is performed with a stack of sieves in a similar manner except that water or another liquid that does not dissolve the material, is continually applied to facilitate particle passage. A detergent is frequently added to promote particle dispersion. This enhanced dispersion is almost essential for fine-particle analysis, because under dry conditions, electrostatic and surface forces greatly impede clean passage and isolation of sizes. A partial vacuum is sometimes applied to fine-particle sieving. Ultrasonic energy dislodges irregular particles trapped in sieve openings provided it is used at moderate density.

The particle mass retained by each sieve is determined by weighing, after drying when necessary, and each fraction is designated by the sieve size it passed and the size on which it was retained.

The particle size, for the purposes of this invention, is determined after the cellulosic material is admixed with 3% by weight of a fine, particulate silica flow control agent, preferably fumed silica. We have determined that dry sieving of the cellulosic materials having an elongated particle shape, i.e., acicular or fibrous particles, without the silica causes the finer particles to agglomerate resulting in an indicated particle size distribution which is larger than the actual dry particle size.

The fumed silica is a well known commercially available product obtained by the vapor phase hydrolysis of silicon tetrachloride at ultra high temperatures.

The well working compositions of our invention can be prepared by adding the cellulosic material or mixture of cellulosic materials of this invention as set forth herein to a water base or oil base well working fluid. Hereinafter the term "SLRA" (for seepage loss reducing additive) will sometimes be used when referring to both the cellulosic material and mixtures of cellulosic materials of this invention. A water base well working composition will generally contain a suspending agent, such as clay or polymer, weight material which may be insoluble, such as barite, siderite, galena, ilmenite, hematite, and the like, or which may be a soluble salt such as sodium chloride, potassium chloride, calcium chloride, calcium bromide, zinc bromide and the like, fluid loss additives such as starch, carboxymethyl cellulose, carboxymethyl starch, polyacrylates and other polymers, and other additives such as viscosity control agents, oil, lubricants, emulsifiers, lost circulation materials and other functional additives. Oil base well working fluids will generally contain additives which provide these same functions, with the exception of the lubricants. Representative suspending agents are the organophilic clays. Representative weight materials are the insoluble materials enumerated above. Representative fluid loss control additives are asphaltic materials, organophilic humates, organophilic lignosulfonates, polymers and the like. Representative emulsifiers are calcium soaps, such as calcium tallate, fatty amides, partial fatty amides of polyamines, and the like.

The amount of the SLRA of this invention added to the well working fluid needs only to be an amount which is effective in reducing the seepage loss to the desired extent. Generally, the more additive added, the greater the seepage loss reduction. Preferably, there is added from about 1 ppb to about 50 ppb of the SLRA, most preferably from about 3 ppb to about 20 ppb.

Another embodiment of our invention is a process to decrease the seepage loss or spurt loss of a well working fluid, particularly drilling fluids, which comprises adding to the well working fluid a quantity of the SLRA of this invention sufficient to effect such decrease. Generally, there will be required from about 1 pound per 42 gallon barrel (ppb) to about 50 ppb, preferably from about 3 ppb to about 20 ppb.

The seepage loss reducing additive of this invention may be added to the well working fluids, either aqueous-base or oil base, utilizing the slugging technique disclosed in Cowan et al. U.S. Pat. No. 4,531,594, incorporated herein by reference. Thus a concentrated "pill" of about 20–50 bbl total volume can be made by mixing from about 15 ppb to about 50 ppb of the SLRA in the well-working fluid. The pill will preferably contain from about 15 ppb to about 40 ppb of the SLRA. The pill may be formulated to also contain a fluid loss reducing additive as disclosed in U.S. Pat. No. 4,531,594. Typical fluid loss reducing additives and typical methods of employing the pill are set forth in U.S. Pat. No. 4,531,594. For aqueous base drilling fluids, well known fluid loss additives may be added to the pill. Alternatively, a fluid loss reducing additive may be admixed with the SLRA before mixing the pill.

An oleaginous liquid can be added to aqueous base well working fluids containing the cellulosic material or mixtures of cellulosic materials of this invention as set forth herein. The SLRA sorbs the oleaginous liquid and concentrates it on the sides of the well thus increasing the lubricating characteristics of the well working fluid and generally further decreasing the seepage loss from the well working fluid. The well working fluid may contain an amount of the oleaginous liquid in excess of the amount which can be sorbed by the SLRA. Alternatively, the oleaginous liquid can be sorbed onto the SLRA of this invention to provide a particulate additive having lubricating characteristics and seepage loss reducing characteristics.

Thus it is another aspect of this invention to provide an additive for water base well working fluids to increase the lubricating characteristics thereof and decrease the seepage loss therefrom which comprises a particulate mixture containing an oleaginous liquid and a cellulosic material selected from the group consisting of oat hulls, cotton burrs, citrus pulp, beet pulp, paper, bagasse, wood, corn cobs, kenaf, peat, rice hulls, rice bran, cottonseed hulls, soybean hulls, nut shells, straw, and mixtures thereof, provided that the cellulosic material has the particle size set forth herein. Preferably the oleaginous liquid is present in the particulate mixture in an amount to provide a weight ratio of the oleaginous liquid to the cellulosic material from about 0.1/1 to about 2/1, most preferably from about 0.15/1 to about 1/1, i.e., from about 9% to about 67%, most preferably from about 13% to about 50%.

The oleaginous liquid may be a high boiling point liquid hydrocarbon of the type used in well working fluids, such as diesel oil, low toxicity paraffinic mineral oils, isoparaffinic oils, and the like. Other oleaginous materials may also be used, such as vegetable oils, animal oils, tall oil, and derivatives thereof, such as acids, esters, amines, amides, alcohols, ethers, amidoamines, sulfonates, sulfates, sulfides, phosphate, etc. The oleaginous liquid may be a solution of a solid oleaginous material in a suitable organic solvent. Preferably the organic solvent is also an oleaginous liquid. The oleaginous liquid may be a solid at ambient temperature and pressure provided that the temperature and pressure while mixing with the SLRA are such that the oleaginous solid is converted to an oleaginous liquid.

Preferably the oleaginous liquid is a liquid hydrocarbon, a vegetable oil, or mixtures thereof.

The SLRA of this invention can be used as a carrying agent for gilsonite or other asphaltene-type material to stabilize troublesome shale sections in a well. Since gilsonite is not water soluble or dispersible, a wetting agent should be admixed with the gilsonite/seepage loss additive composite material to ensure adequate dispersion of the gilsonite in the aqueous base drilling fluid. Preferred wetting agents are non-ionic surfactants such as polyethoxylated alcohols, alkyl phenols, and the like organic materials which contain at least one hydroxyl group and a large hydrocarbon radical within their molecular structure.

Gilsonite and asphaltic-type materials have been used to stabilize sloughing shales to reduce borehole erosion. It is theorized that the gilsonite penetrates the shale pore spaces, microfractures, and bedding planes of the shale as the drill bit penetrates the formation. Presumeably the gilsonite extrudes into the pores, fractures, and bedding planes to reduce or minimize filtrate and whole mud invasion and thus bond the matrix to prevent sloughing. The SLRA of this invention then functions to bridge across the surface of the shale reducing the seepage of the drilling fluid into the formation. The fluid loss control agent in the drilling fluid enables the drilling fluid to form an impermeable filter cake on the sides of the borehole thus minimizing the loss of fluid to the formations contacted by the drilling fluid.

A crosslinkable polymer can be admixed with the SLRA of this invention to form a plugging agent for boreholes experiencing gross lost circulation of whole mud to the formation, i.e., circulation losses greater than about 10 bbl/hr. The plugging agent will be added to either an aqueous liquid or an oleaginous liquid, depending on the properties of the polymer, at a concentration of about 10 ppb to about 75 ppb. Thereafter a crosslinking additive may be added, and the plugging liquid pumped as a "pill" or "slug" to the zone of lost circulation in the well. The type of crosslinking additive and its concentration is chosen such that the plugging liquid forms a rubbery, semi-solid mass by the time that it reaches the lost circulation zone.

Suitable water soluble or water dispersible polymers for use in aqueous liquids are polymers containing hydroxyl groups located on adjacent carbon atoms in the cis configuration, as is well known in the art. Suitable polysaccharides are disclosed in Walker U.S. Pat. No. 3,215,634, incorporated herein by reference. Dihydroxypropyl-modified polysaccharides as disclosed in Sandy et al. U.S. Pat. No. 4,649,999, incorporated herein by reference, as is polyvinylalcohol (see Savins U.S. Pat. No. 3,299,952, incorporated herein by reference). Suitable crosslinking additives for these polymers are borate-yielding compounds such as those disclosed in the aforesaid patents and Mondshine U.S. Pat. No. 4,619,776, incorporated herein by reference. Other crosslinkable polymers and crosslinking additives therefor are given in the following U.S. Pat. Nos., incorporated herein by reference: Hodge—U.S. Pat. No. 4,657,081, Kucera—U.S. Pat. No. 4,692,254; Sydansk et al.—U.S. Pat. No. 4,722,397; Hanlon et al.—U.S. Pat. No. 4,767,550.

In order to more completely describe the invention, the following non-limiting examples are given. In these examples and this specification, the following abbreviations may be used: ppb=pounds per 42 gallon barrel; bbl=42 gallon barrel; sec=seconds; hr=hours; m=meters; %=percent; API=American Petroleum Institute; SLRA=seepage loss reducing additive; CM=cellulosic material; cc=cubic centimeters; CFL=complete fluid loss; psi=pounds per square inch. All mesh sizes used in the description of the invention are in terms of U.S. Standard Sieve Series, Fine Series of 1940. A particle size designated +X indicates the particles were retained on a sieve of size X mesh. A particle indicated Y/Z indicates that the particles passed through a sieve of mesh size Y and were retained on a sieve of mesh size Z. A particle size designated —W indicates that the particles all passed a sieve of mesh size W.

The size of the sieve openings in micrometers (microns) for the various sieve mesh sizes set forth herein are as follows: 30 mesh=590 microns, 60 mesh=250 microns, 100 mesh=149 microns, and 200 mesh=74 microns. Thus a particle size designation of +30 mesh indicates that the particles are >590 microns (greater than 590 microns). A particle size designation of 30/60 mesh indicates that the particles are <590 microns (less than 590 microns) and >250 microns. A particle size of 60/100 mesh indicates that the particles are <250 microns and >149 microns. A particle size of 100/200 mesh indicates that the particles are <149 microns and >74 microns. A particle size of −200 mesh indicates that the particles are <74 microns. A particle size of 30/100 mesh indicates that the particles are <590 microns and >149 microns.

The particle size distribution of the various samples evaluated in the Examples is set forth in Table A. All percentages throughout the Tables, Examples, and this specification are weight percent unless otherwise indicated.

The particle size of the various cellulosic materials was determined using the following procedure: A series of sieves of varying mesh sizes (U.S. Standard Sieve Series) with openings diminishing in size from the top downward were stacked over a solid bottom pan. The samples were admixed with 3% by weight fumed silica (CAB-O-SIL M5), placed on the top sieve, covered, placed on a RO-TAP sieve shaker, and shaken for 10 minutes. The weight of sample retained on each sieve and in the pan were determined, and the % by weight of sample on each sieve calculated.

The water base drilling fluid used in the examples contained 27.5 ppb API grade bentonite hydrated in fresh water unless otherwise indicated.

EXAMPLE I

The cotton burrs, corn cobs, cotton, peanut shells, citrus pulp, beet pulp, rice bran, rice hulls, paper, wood flour, peat, and cottonseed hulls, and combinations thereof with the oat hulls were evaluated at a concentration of 10 ppb as seepage loss reducing additives in the water base drilling fluid. The ability of the fluid to seal off a porous sand was evaluated in the following manner: 200 grams of a 16/30 mesh silica sand were placed in a standard API filter press with a 20 mesh AZO screen in place of the API screen and filter paper; water was added, and the water drained by blowing nitrogen gas through the sand; about 1 bbl equivalent of a fluid sample was added to the API cell and 100 psi differential pressure was applied as in the standard API fluid loss test; thereafter, the fluid which seeped through the sand pack was caught until the sand pack was sealed, i.e., when only drops of fluid emerged from the sand pack. The volume of the fluid which seeped through the sand pack and the time to form the seal were measured, as was the total volume of fluid which seeped through the sand pack over a period of 30 minutes. The data obtained are given in Table I.

EXAMPLE II

The oat hulls and cotton burrs, and mixtures thereof, were mixed with Escaid 110 paraffinic mineral oil and evaluated as in Example 1. The data obtained are given in Table II.

EXAMPLE III

The oat hulls and corn cob flour, and mixtures thereof, were mixed with Escaid 110 paraffinic mineral oil and evaluated as in Example 1. The data obtained are given in Table III.

EXAMPLE IV

The oat hulls and peanut shells, and mixtures thereof, were mixed with Escaid 110 mineral oil and evaluated as in Example 1. The data obtained are given in Table IV.

EXAMPLE V

The oat hulls and citrus pulp, and mixtures thereof, were mixed with Escaid 110 mineral oil and evaluated as in Example 1. The data obtained are given in Table V.

EXAMPLE VI

The oat hulls and cotton, and mixtures thereof, were mixed with Escaid 110 mineral oil and evaluated as in Example 1. The data obtained are given in Table VI.

EXAMPLE VII

The beet pulp, rice bran, rice hulls, ground paper, wood flour, cottonseed hulls, and peat, and mixtures thereof with oat hulls, were mixed with Escaid 110 mineral oil and evaluated as in Example 1. The data obtained are given in Table VII.

EXAMPLE VIII

The corn cobs, cotton, peanut shells, citrus pulp, beet pulp, rice bran, rice hulls, ground paper, wood flour, peat, and cottonseed hulls, and combinations thereof with the cotton burrs were evaluated as in Example 1. The data obtained are given in Table VIII.

EXAMPLE IX

The corn cobs, cotton, peanut shells, citrus pulp, beet pulp, rice bran, rice hulls, ground paper, wood flour, cottonseed hulls, and peat, and mixtures thereof with the cotton burrs were mixed with Escaid 110 mineral oil and evaluated as in Example 1. The data obtained are given in Table IX.

TABLE A

| Cellulosic Material | Particle Size Distribution of CM, % | | | | |
|---|---|---|---|---|---|
| | +30 | 30/60 | 60/100 | 100/200 | −200 |
| Oat Hulls | 0 | 13.3 | 41.0 | 13.7 | 32.0 |
| Cotton Burrs | 0 | 5.7 | 30.6 | 29.9 | 33.8 |
| Corn Cobs | 0.1 | 18.2 | 35.7 | 27.0 | 19.0 |
| Cotton | 1.9 | 2.3 | 24.4 | 47.9 | 23.5 |
| Citrus Pulp | 0 | 2.9 | 49.0 | 20.4 | 27.7 |
| Peanut Shells | 0 | 7.4 | 36.9 | 21.7 | 34.0 |
| Wood Flour | 0.2 | 23.5 | 43.0 | 18.0 | 15.3 |
| Beet Pulp | 3.5 | 55.0 | 17.0 | 5.3 | 19.2 |
| Rice Bran | 0 | 51.1 | 38.0 | 10.6 | 0.3 |
| Rice Hulls | 0 | 6.6 | 27.9 | 25.8 | 39.7 |
| Group Paper | 19.8 | 33.3 | 19.5 | 17.2 | 10.2 |
| Cottonseed Hulls | 2.8 | 47.2 | 22.1 | 17.1 | 10.8 |
| Peat | 0.5 | 39.3 | 20.9 | 21.8 | 17.5 |

TABLE I

| Sample | Sample Composition | | | 16/30 Sand Pack | | |
|---|---|---|---|---|---|---|
| | % Oat Hulls | Other Seepage Loss Additive | % Other | Spurt Time, sec. | Spurt Loss, cc. | Total Loss, cc. |
| — | 0 | None | 9 | 10 | 205 | CFL |

TABLE I-continued

| Sample | % Oat Hulls | Other Seepage Loss Additive | % Other | Spurt Time, sec. | Spurt Loss, cc. | Total Loss, cc. |
|---|---|---|---|---|---|---|
| A | 100 | None | 0 | 11 | 40 | 67.5 |
| B | 0 | Cotton Burrs | 100 | 12 | 67 | 78 |
| C | 75 | Cotton Burrs | 25 | 12 | 35 | 52 |
| D | 50 | Cotton Burrs | 50 | 11 | 27 | 42 |
| E | 25 | Cotton Burrs | 75 | 10.5 | 24 | 37 |
| F | 0 | Corn Cobs | 100 | 13 | 62 | 88 |
| G | 75 | Corn Cobs | 25 | 9 | 32 | 50 |
| H | 50 | Corn Cobs | 50 | 13 | 31 | 46 |
| I | 25 | Corn Cobs | 75 | 18 | 45 | 64 |
| J | 0 | Cotton | 100 | 14 | 200 | CFL |
| K | 75 | Cotton | 25 | 8 | 38 | 45 |
| L | 50 | Cotton | 50 | 14 | 39 | 54 |
| M | 25 | Cotton | 75 | 23 | 82 | 99 |
| N | 0 | Peanut Shells | 100 | 2 | 2.5 | 15.5 |
| O | 75 | Peanut Shells | 25 | 6 | 17 | 32 |
| P | 50 | Peanut Shells | 50 | 5 | 6.5 | 20.5 |
| Q | 25 | Peanut Shells | 75 | 3 | 4 | 17 |
| R | 0 | Citrus Pulp | 100 | 4 | 2 | 16 |
| S | 75 | Citrus Pulp | 25 | 7 | 17 | 31 |
| T | 50 | Citrus Pulp | 50 | 8 | 17 | 28 |
| U | 25 | Citrus Pulp | 75 | 7 | 12 | 22 |
| V | 0 | Beet Pulp | 100 | 5 | 8.5 | 17.5 |
| W | 50 | Beet Pulp | 50 | 5 | 14 | 25 |
| X | 0 | Rice Bran | 100 | 18 | 126 | 148 |
| Y | 50 | Rice Bran | 50 | 9 | 36 | 49 |
| Z | 0 | Rice Hulls | 100 | 3 | 12 | 26 |
| AA | 50 | Rice Hulls | 50 | 5 | 21 | 34 |
| AB | 0 | Ground Paper | 100 | 5 | 28 | 40 |
| AC | 50 | Ground Paper | 50 | 6 | 30 | 45 |
| AD | 0 | Wood Flour | 100 | 25 | 100 | 116 |
| AE | 50 | Wood Flour | 50 | 16 | 40 | 50 |
| AF | 0 | Cotton Seed Hulls | 100 | 6 | 51 | 65 |
| AG | 50 | Cotton Seed Hulls | 50 | 10 | 51 | 66 |
| AH | 0 | Peat | 100 | 2 | 4 | 13 |
| AI | 50 | Peat | 50 | 7 | 8 | 20 |

TABLE II

| Sample | % Oat Hulls | % Ground Burrs | % Mineral Oil | Spurt Time, sec. | Spurt Loss, cc. | Total Loss, cc. |
|---|---|---|---|---|---|---|
| A | 67 | 0 | 33 | 14 | 63.5 | 72.5 |
| B | 0 | 67 | 33 | 13 | 39 | 54 |
| C | 50 | 17 | 33 | 7 | 27 | 36 |
| D | 33.5 | 33.5 | 33 | 7 | 22 | 34 |
| E | 17 | 50 | 33 | 12.5 | 47.5 | 60 |
| F | 80 | 0 | 20 | 15 | 57 | 68 |
| G | 0 | 80 | 20 | 10 | 27 | 38 |
| H | 60 | 20 | 20 | 8 | 28 | 41 |
| I | 40 | 40 | 20 | 9 | 16 | 28 |
| J | 20 | 60 | 20 | 7 | 19 | 31 |

TABLE III

| Sample | % Oat Hulls | % Corn Cobs | % Mineral Oil | Spurt Time, sec. | Spurt Loss, cc. | Total Loss, cc. |
|---|---|---|---|---|---|---|
| A | 67 | 0 | 33 | 14 | 63.5 | 72.5 |
| B | 0 | 67 | 33 | 12.5 | 42.5 | 57.5 |
| C | 50 | 17 | 33 | 5 | 32 | 45 |
| D | 33.5 | 33.5 | 33 | 7 | 22 | 36 |
| E | 17 | 50 | 33 | 20 | 49 | 65 |
| F | 80 | 0 | 20 | 15 | 57 | 68 |
| G | 0 | 80 | 20 | 20 | 56 | 71 |
| H | 60 | 20 | 20 | 11 | 22 | 39 |
| I | 40 | 40 | 20 | 7 | 22 | 36 |
| J | 20 | 60 | 20 | 12 | 27 | 43 |

TABLE IV

| Sample | % Oat Hulls | % Peanut Shells | % Mineral Oil | Spurt Time, sec. | Spurt Loss, cc. | Total Loss, cc. |
|---|---|---|---|---|---|---|
| A | 67 | 0 | 33 | 14 | 63.5 | 72.5 |
| B | 0 | 67 | 33 | 3 | 1 | 12 |
| C | 50 | 17 | 33 | 5 | 14 | 26 |
| D | 33.5 | 33.5 | 33 | 5 | 4 | 17 |
| E | 17 | 50 | 33 | 4 | 2 | 15 |

TABLE V

| Sample | % Oat Hulls | % Citrus Pulp | % Mineral Oil | Spurt Time, sec. | Spurt Loss, cc. | Total Loss, cc. |
|---|---|---|---|---|---|---|
| A | 67 | 0 | 33 | 14 | 63.5 | 72.5 |
| B | 0 | 67 | 33 | 5 | 3 | 17 |
| C | 50 | 17 | 33 | 8 | 14 | 26 |
| D | 33.5 | 33.5 | 33 | 6 | 14 | 25 |
| E | 17 | 50 | 33 | 4 | 2 | 15 |

TABLE VI

| Sample | % Oat Hulls | % Cotton | % Mineral Oil | Spurt Time, sec. | Spurt Loss, cc. | Total Loss, cc. |
|---|---|---|---|---|---|---|
| A | 67 | 0 | 33 | 14 | 63.5 | 72.5 |
| B | 0 | 67 | 33 | 19 | 145 | 170 |
| C | 50 | 17 | 33 | 8 | 38 | 52 |
| D | 33.5 | 33.5 | 33 | 8 | 36 | 50 |
| E | 17 | 50 | 33 | 16 | 86 | 102 |
| F | 50 | 0 | 50 | 8 | 34 | 47 |
| G | 0 | 50 | 50 | 21 | 104 | 119 |
| H | 37.5 | 12.5 | 50 | 5 | 21 | 35 |
| I | 25 | 25 | 50 | 5 | 20 | 34 |
| J | 12.5 | 37.5 | 50 | 9 | 50 | 66 |

TABLE VII

| Sample | % Oat Hulls | Other Cellulosic Material, % | % Mineral Oil | Spurt Time sec. | Spurt Loss cc. | Total Loss cc. |
|---|---|---|---|---|---|---|
| A | 67 | None, 0 | 33 | 14 | 63.5 | 72.5 |
| B | 0 | Beet Pulp, 67 | 33 | 6 | 9.5 | 19.5 |
| C | 33.5 | Beet Pulp, 33.5 | 33 | 5 | 14 | 26 |
| D | 0 | Rice Bran, 67 | 33 | 19 | 152 | 160 |
| E | 33.5 | Rice Bran, 33.5 | 33 | 8 | 32 | 42 |
| F | 0 | Rice Hulls, 67 | 33 | 4 | 18 | 30 |
| G | 33.5 | Rice Hulls, 33.5 | 33 | 4 | 20 | 33 |
| H | 0 | Ground Paper, 67 | 33 | 6 | 42 | 54 |
| I | 33.5 | Ground Paper, 33.5 | 33 | 7 | 32 | 45 |
| J | 0 | Wood Flour, 67 | 33 | 29 | 118 | 137 |
| K | 33.5 | Wood Flour, 33.5 | 33 | 14 | 61 | 76 |
| L | 0 | Cotton Seed Hulls, 67 | 33 | 8 | 64 | 74 |

TABLE VII-continued

| | Sample Composition | | | 16/30 Sand Pack | | |
|---|---|---|---|---|---|---|
| Sample | % Oat Hulls | Other Cellulosic Material, % | % Mineral Oil | Spurt Time sec. | Spurt Loss cc. | Total Loss cc. |
| M | 33.5 | Cotton Seed Hulls, 33.5 | 33 | 12 | 68 | 81 |
| N | 0 | Peat, 67 | 33 | 2 | 2 | 11 |
| O | 33.5 | Peat, 33.5 | 33 | 4 | 4 | 15 |

TABLE VIII

| | Sample Composition | | 16/30 Sand Pack | | |
|---|---|---|---|---|---|
| Sample | % Cotton Burrs | Other Seepage Loss Additive, % | Spurt Time sec. | Spurt Loss cc. | Total Loss cc. |
| A | 100 | None, 0 | 12 | 67 | 78 |
| B | 0 | Corn Cobs, 100 | 13 | 62 | 88 |
| C | 50 | Corn Cobs, 50 | 5 | 11 | 24 |
| D | 0 | Cotton, 100 | 14 | 200 | CFL |
| E | 50 | Cotton, 50 | 8 | 18 | 34 |
| F | 0 | Peanut Shells, 100 | 2 | 2.5 | 15.5 |
| G | 50 | Peanut Shells, 50 | 5 | 9 | 22 |
| H | 0 | Citrus Pulp, 100 | 4 | 2 | 16 |
| I | 50 | Citrus Pulp, 50 | 4 | 7.5 | 17.5 |
| J | 0 | Beet Pulp, 100 | 5 | 8.5 | 17.5 |
| K | 50 | Beet Pulp, 50 | 5 | 10.5 | 21 |
| L | 0 | Rice Bran, 100 | 18 | 126 | 148 |
| M | 50 | Rice Bran, 50 | 8 | 38 | 50 |
| N | 0 | Rice Hulls, 100 | 3 | 12 | 26 |
| O | 50 | Rice Hulls, 50 | 5 | 17 | 30 |
| P | 0 | Ground Paper, 100 | 5 | 28 | 40 |
| Q | 50 | Ground Paper, 50 | 5 | 22 | 33 |
| R | 0 | Wood Flour, 100 | 25 | 100 | 116 |
| S | 50 | Wood Flour, 50 | 5 | 11 | 24 |
| T | 0 | Cotton Seed Hulls, 100 | 6 | 51 | 65 |
| U | 50 | Cotton Seed Hulls, 50 | 8 | 45 | 57 |
| V | 0 | Peat, 100 | 2 | 4 | 13 |
| W | 50 | Peat, 50 | 5 | 4 | 13 |

TABLE IX

| | Sample Composition | | | 16/30 Sand Pack | | |
|---|---|---|---|---|---|---|
| Sample | % Oat Hulls | Other Cellulosic Material, % | % Mineral Oil | Spurt Time sec. | Spurt Loss cc. | Total Loss cc. |
| A | 67 | None, 0 | 33 | 13 | 39 | 54 |
| B | 0 | Corn Cobs, 67 | 33 | 12.5 | 42.5 | 57.5 |
| C | 33.5 | Corn Cobs, 33.5 | 33 | 5 | 8 | 21 |
| D | 0 | Cotton, 67 | 33 | 19 | 145 | 170 |
| E | 33.5 | Cotton, 33.5 | 33 | 6 | 28 | 40 |
| F | 0 | Peanut Shells, 67 | 33 | 3 | 1 | 12 |
| G | 33.5 | Peanut Shells, 33.5 | 33 | 3 | 3 | 13 |
| H | 0 | Citrus Pulp, 67 | 33 | 5 | 3 | 17 |
| I | 33.5 | Citrus Pulp, 33.5 | 33 | 5 | 12.5 | 23.5 |
| J | 0 | Beet Pulp, 67 | 33 | 6 | 9.5 | 19.5 |
| K | 33.5 | Beet Pulp, 33.5 | 33 | 4 | 11 | 21 |
| L | 0 | Rice Bran, 67 | 33 | 19 | 152 | 160 |
| M | 33.5 | Rice Bran, 33.5 | 33 | 9 | 38 | 48 |
| N | 0 | Rice Hulls, 67 | 33 | 4 | 18 | 30 |
| O | 33.5 | Rice Hulls, 33.5 | 33 | 5 | 20 | 31 |
| P | 0 | Ground Paper, 67 | 33 | 6 | 42 | 54 |
| Q | 33.5 | Ground Paper, 33.5 | 33 | 4 | 26 | 37 |
| R | 0 | Wood Flour, 67 | 33 | 29 | 118 | 137 |
| S | 33.5 | Wood Flour, 33.5 | 33 | 8 | 23 | 37 |
| T | 0 | Cotton Seed Hulls, 67 | 33 | 8 | 64 | 74 |
| U | 33.5 | Cotton Seed Hulls, 33.5 | 33 | 7 | 38 | 50 |
| V | 0 | Peat, 67 | 33 | 2 | 2 | 11 |
| W | 33.5 | Peat, 33.5 | 33 | 4 | 9 | 18 |

What is claimed is:

1. An additive for decreasing the seepage loss of a fluid from a well working fluid in contact with a permeable formation which comprises a cellulosic material selected from the group consisting of oat hulls, paper, bagasse, peat, corn cobs, kenaf, rice hulls, rice bran, straw, cottonseed hulls, soybean hulls, and mixtures thereof, provided that the cellulosic material has the particle size distribution PSD#1 or PSD#2; wherein PSD#1 is as follows: >590 microns <20%, <590 microns and >250 microns=0%-100%, <250 microns and >149 microns=0%-100%, <149 microns and >74 microns=0%-60%, <74 microns=0%-60%, and <590 microns and >149 microns ≧15%; and wherein PSD#2 is as follows: >590 microns <10%, <590 microns and >250 microns=0%-30%, <250 microns and >149 microns=0%-30%, <149 microns and >74 microns ≧15%, and <74 microns=0%-70%; the particle size being determined by dry sieve analysis after admixing the cellulosic material with 3% of fumed silica.

2. The additive of claim 1 having the particle size distribution PSD#1.

3. The additive of claim 1 having the particle size distribution PSD#2.

4. The additive of claim 1, 2, or 3, wherein the cellulosic material is selected from the group consisting of corn cobs, peat, paper, rice bran, and mixtures thereof.

5. The additive of claim 1, 2, or 3 wherein the cellulosic material is oat hulls.

6. An additive for decreasing the seepage loss of a fluid from a well working fluid in contact with a permeable formation which comprises a particulate mixture of a first cellulosic material selected from the group consisting of oat hulls, cotton burrs, and mixtures thereof, and a second cellulosic material selected from the group consisting of paper, bagasse, wood, peat, kenaf, rice hulls, rice bran, cottonseed hulls, soybean hulls, straw, peanut shells, nut shells, cotton, and mixtures thereof, provided that the particulate mixture has the particle size distribution PSD#1 or PSD#2; wherein PSD#1 is as follows: >590 microns <20%, <590 microns and >250 microns=0%-100%, <250 microns and >149 microns=0%–30%, <149 microns and >74 microns ≥15%, and <74 microns=0%–70%; the particle size being determined by dry sieve analysis after admixing the cellulosic material with 3% of fumed silica.

7. The additive of claim 6 wherein the particulate mixture has the particle size distribution PSD#1.

8. The additive of claim 6 wherein the particulate mixture has the particle size distribution PSD#2.

9. The additive of claim 6, 7, or 8 wherein the second cellulosic material is selected from the group consisting of paper, peat, rice hulls, rice bran, cotton, and mixtures thereof.

10. An additive for decreasing the seepage loss of a fluid from a water base well working fluid in contact with a permeable formation and for increasing the lubricating characteristics of the well working fluid which comprises a particulate mixture containing an oleaginous liquid and a cellulosic material selected from the group consisting of oat hulls, cotton burrs, paper, bagasse, wood, corn cobs, kenaf, peat, rice hulls, rice bran, cottonseed hulls, soybean hulls, nut shells, straw, and mixtures thereof, provided that the cellulosic material has the particle size distribution PSD#1 or PSD#2; wherein PSD#1 is as follows: >590 microns <20%, <590 microns and >250 microns=0%–100%, <250 microns and >149 microns=0%–100%, <149 microns and >74 microns=0%–60%, <74 microns=0%–60%, and <590 microns and >149 microns ≥15%; wherein PSD#2 is as follows: >590 microns <10%, <590 microns and >250 microns=0%–30%, <250 microns and >149 microns=0%–30%, <149 microns and >74 microns ≥15%, and <74 microns=0%–70%; the particle size being determined by dry sieve analysis after admixing the cellulosic material with 3% of fumed silica.

11. The additive of claim 10 wherein the cellulosic material has the particle size distribution PSD#1.

12. The additive of claim 10 wherein the cellulosic material has the particle size distribution PSD#2.

13. The additive of claim 10, 11, or 12, wherein the cellulosic material is selected from the group consisting of cotton burrs, paper, corn cobs, peat, rice hulls, rice bran, and mixtures thereof.

14. The additive of claim 10, 11, or 12 wherein the cellulosic material is oat hulls.

15. The additive of claim 10, 11, or 12 wherein the cellulosic material is cotton burrs.

16. A drilling fluid comprising as a major constituent a liquid selected from the group consisting of water, oil, and mixtures thereof, and sufficient of the additive of claim 1, 2, 3, 6, 7, 8, 10, 11 or 12 to decrease the seepage loss of the drilling fluid.

* * * * *
* * * * *